United States Patent
Katayama et al.

(10) Patent No.: US 7,646,408 B2
(45) Date of Patent: Jan. 12, 2010

(54) IMAGE DATA REPRODUCING APPARATUS, METHOD OF CONTROLLING SAME AND CONTROL PROGRAM THEREFOR

(75) Inventors: Noriko Katayama, Tokyo (JP); Toshita Hara, Tokyo (JP); Takeharu Omata, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

(21) Appl. No.: 11/715,459

(22) Filed: Mar. 8, 2007

(65) Prior Publication Data

US 2007/0211160 A1  Sep. 13, 2007

(30) Foreign Application Priority Data

Mar. 9, 2006  (JP) ............................. 2006-063452

(51) Int. Cl.
  *H04N 5/76* (2006.01)
(52) U.S. Cl. ............. 348/231.1; 348/211.1; 348/333.01
(58) Field of Classification Search ............. 348/207.1, 348/211.1–211.3, 231.3, 333.01, 333.02
See application file for complete search history.

(56) References Cited

U.S. PATENT DOCUMENTS

2007/0285339 A1* 12/2007 Yamazaki ................... 345/1.1
2008/0018931 A1* 1/2008 Tanaka ...................... 358/1.15
2008/0316319 A1* 12/2008 Nomoto ................... 348/207.1

FOREIGN PATENT DOCUMENTS

| JP | 2001-69296 | 3/2001 |
| JP | 2004-312163 | 11/2004 |

* cited by examiner

*Primary Examiner*—Lin Ye
*Assistant Examiner*—Gevell Selby
(74) *Attorney, Agent, or Firm*—McGinn IP Law Group, PLLC

(57) ABSTRACT

It is so arranged that the user of a device such as a digital still camera can ascertain the transfer history of an image file that has been transferred to the camera. An image file is obtained by "Mr. A" shooting a subject using a digital still camera, whereupon information concerning the owner of the camera is read and "Mr. A" is written to a photographer/transferor history table as the photographer of the image file. The table is placed in the header recording area of the image file. If the image file is transferred to a "Miss B", the table is read out of the image file and "Miss B" is written to the table as the transferor of the image file. The table thus updated is placed in the header recording area of the image file. One can determine the photographer and transferor of the image file by referring to the table.

7 Claims, 12 Drawing Sheets

PHOTOGRAPHER / TRANSFEROR HISTORY TABLE

| PHOTOGRAPHER / TRANSFEROR | PHOTOGRAPHER / TRANSFEROR INFORMATION |
|---|---|
| PHOTOGRAPHER | Taro. TOKKYO |
| TRANSFEROR 1 | Shinko. JITSUYO |
| TRANSFEROR 2 | Kenzo. ISHOU |
| TRANSFEROR 3 | Hanako. SHOHYO |
| ⋮ | ⋮ |

Fig. 3

OWNER INFORMATION

21 → Taro.TOKKYO
22 → http://www.ooo.jp
23 → taro.tokkyo@ooo.jp

IMAGE DATA REPRODUCING APPARATUS, METHOD OF CONTROLLING SAME AND CONTROL PROGRAM THEREFOR

BACKGROUND OF THE INVENTION

1. Field of the Invention

This invention relates to an image reproducing apparatus, a method of controlling this apparatus and a control program therefor.

2. Description of the Related Art

Available on the market is an image display device for displaying an image represented by image data that is input to the device and that represents an image obtained by imaging a subject using a digital still camera or the like. Such an image display device is also capable of outputting the input image data to other image display devices. Thus the image data is passed among a number of image display devices. Such image display devices include one in which image data is prevented from being output to the device again if the image data has already been output to this device. (see the specification of Japanese Patent Application Laid-Open No. 2001-69296).

There is also a technique in which it is so arranged that if image data has been transmitted, the recipient of the image data can determine the sender (see the specification of Japanese Patent Application Laid-Open No. 2004-312163).

However, the recipient cannot ascertain via which users the image data was input.

SUMMARY OF THE INVENTION

Accordingly, an object of the present invention is to so arrange it that it can be determined via which users image data has been input.

According to the present invention, the foregoing object is attained by providing an image reproducing apparatus comprising: a data input device for inputting image data, photographer data representing a photographer who has shot the image of a subject represented by the image data, and transfer history data representing a history of transferors indicative of owners of image reproducing apparatuses to which the image data has already been input; a display device for displaying on a display screen the image of the subject represented by the image data that has been input from the data input device; an owner's-data storage device for storing owner's data; a transfer history data updating device for executing update processing whereby owner's data that has been stored in the owner's-data storage device is added to the transfer history data; and an output device for outputting the image data and photographer data that has been input from the data input device and transferor history data that has been subjected to update processing by the transfer history data updating device.

The present invention also provides a control method suited to the above-described image reproducing apparatus. Specifically, the present invention provides a method of controlling an image reproducing apparatus comprising the steps of: inputting image data, photographer data representing a photographer who has shot the image of a subject represented by the image data, and transfer history data representing a history of transferors indicative of owners of image reproducing apparatuses to which the image data has already been input; displaying on a display screen the image of the subject represented by the image data that has been input; storing owner's data in advance; executing update processing whereby owner's data that has been stored is added to the transfer history data; and outputting the image data and photographer data that has been input and transferor history data that has been subjected to update processing.

The present invention also provides a program for implementing the above-described method of controlling an image reproducing apparatus.

In accordance with the present invention, image data, photographer data representing a photographer who has shot the image of a subject represented by the image data, and transfer history data representing a history of transferors of the image data is input. The image of the subject represented by the input image data is displayed on the display screen of a display device. When the transferor history data is input, owner's data representing the owner of the image reproducing apparatus is added to the input transferor history data. The transferor history data to which the owner's data has been added is output together with the photographer data and image data. The owner of the image reproducing device to which the image data has been input can be determined from the transferor history data and thus it is possible to determine via which uses the image data was input.

The apparatus may further comprise a classifying device for classifying, by photographer or by transferor, the image data that has been input from the data input device; and a first display control device for controlling the display device in such a manner that the image of a subject represented by image data that has been classified by the classifying device is displayed on the display screen. Thus the preference exhibited by the images of the photographer or of a transferor who input the images previously can be determined.

The apparatus may further comprise a second display control device for controlling the display device in such a manner that the transferor history represented by the transfer history data that has been input from the data input device is displayed on the display screen.

The apparatus may further comprise an owner's-data input device for inputting owner's data. In this case the owner's-data storage device would store owner's data that has been input from the owner's-data input device.

The apparatus may further comprise a third display control device for controlling the display device in such a manner that owner information represented by owner's data that has been stored in the owner's-data storage device is displayed on the display screen.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 illustrates an example of owner information;

DESCRIPTION OF THE PREFERRED EMBODIMENT

A preferred embodiment of the present invention will now be described in detail with reference to the drawings.

Figure 1:
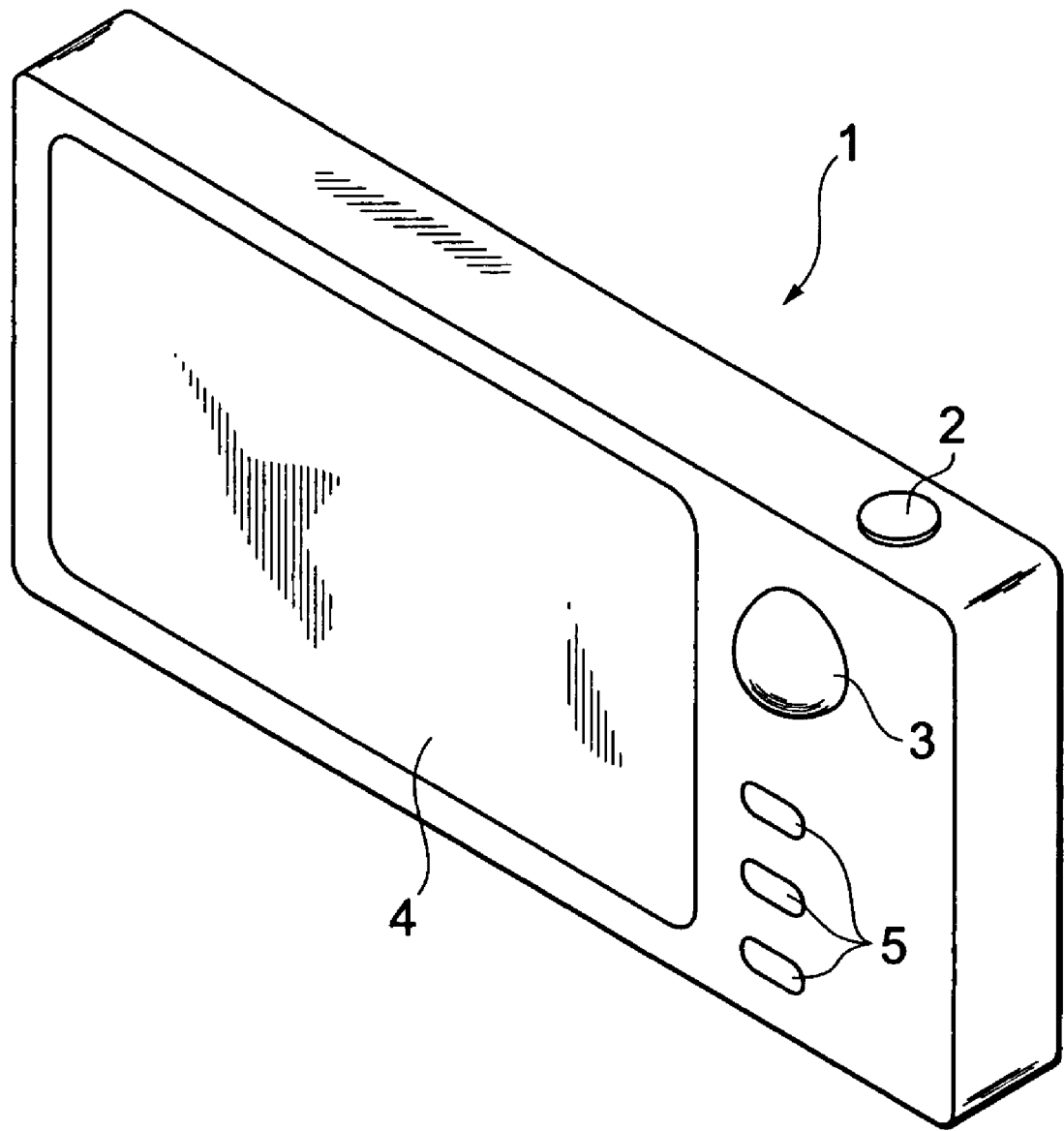
FIG. 1 is a back view of a digital still camera.

FIG. 1, which shows an embodiment of the present invention, is a perspective view illustrating a digital still camera as seen from its back side.

A shutter-release button 2 is provided on the top of the digital still camera 1 on the right side thereof.

A display screen 4 is provided on the back side of the digital still camera 1 substantially over the entirety thereof. A track ball 3 is provided in a freely rotatably manner at the upper right of the display screen 4. Buttons 5 such as a decide button and menu button are provided at the lower right of the display screen 4.

Figure 2:
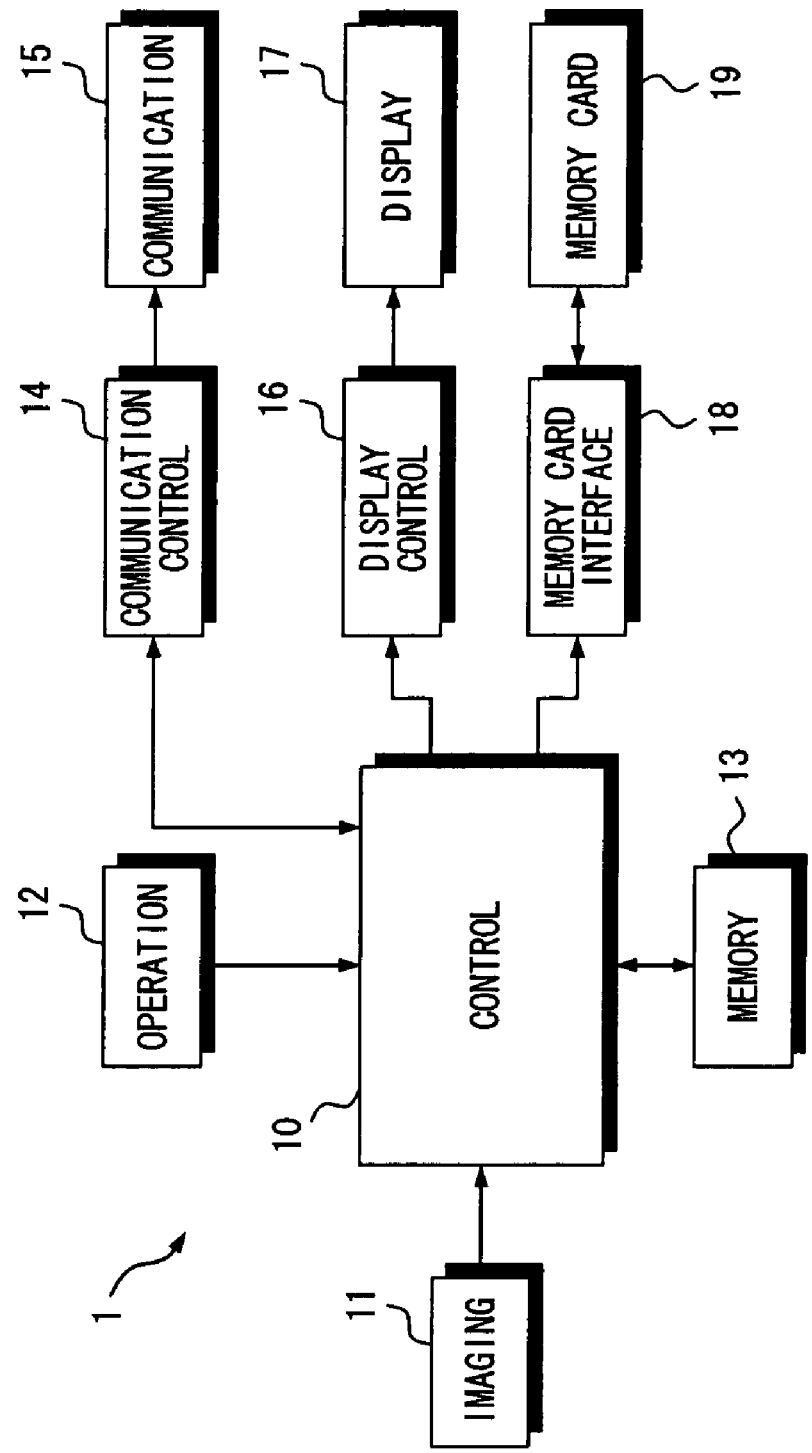
FIG. 2 is a block diagram illustrating the electrical structure of the digital still camera.

FIG. 2 is a block diagram illustrating the electrical structure of the digital still camera 1.

The overall operation of the digital still camera 1 is controlled by a control circuit 10.

Operation signals that are output from an operating unit 12 such as the shutter-release button 2, track ball 3 and buttons 5 are input to the control circuit 10. The operating unit 12 also includes a mode dial. The mode dial is for setting various modes such as an image sensing mode, playback mode, transmit mode and receive mode, etc. Although the details will be described later, the playback mode includes an owner-information display mode, an image playback mode and a classifying mode.

The digital still camera 1 is provided with a communication unit 15 controlled by a communication control circuit 14. The communication unit 15 sends and receives image data, receives owner's data, etc. An operating program can also be received by the communication unit 15. The received operating program is stored in a memory 13 and the camera operates in accordance with the operating program.

The memory 13, which stores prescribed data and owner's data, etc., is connected to the control circuit 10.

FIG. 3 illustrates an example of owner information represented by owner's data.

The owner information includes the name 21 of the owner of the digital still camera 1, address 22 of the website of the owner and e-mail address 23 of the owner, etc. It goes without saying that among these items of information, information that is not possessed by the owner of the digital still camera 1 is not stored in the memory 13. Of course, information other these items of information (e.g., a thumbnail image representing the owner) may be stored in the memory 13 as owner information.

With reference again to FIG. 2, the image of a subject is sensed by the image sensing unit 11 if the image sensing mode is set. The image data representing the image of the subject is output from the image sensing unit 11 and input to the control circuit 10. The image data is applied to a display control circuit 16. As a result, the image of the subject obtained by imaging is displayed on the display screen of a display unit 17 by the display control circuit 16.

If the shutter-release button is pressed, the image data obtained in the manner described above is input to the control circuit 10. The owners' data is read out of the memory 13 and a photographer/transferor history table is generated in a manner described later (see FIG. 4). An image file is generated. In the generated image file, the photographer/transferor history table that has been generated is stored in a header-information recording area and the image data is stored in an image-data recording area. The generated image file is applied to and stored on a memory card 19 via a memory card interface 18.

If the image playback mode is set upon being selected from among the playback modes, an image file that has been recorded on the memory card 19 is read. The read image file is input to the control circuit 10 via the memory card interface 18. The image file is applied to the display control circuit 16 by the control circuit 10. The image of the subject represented by the image file that has been read from the memory card 19 is displayed on the display screen of the display unit 17.

Although the details will be described later, the playback modes also include a photographer information playback mode and a transfer history display mode besides a normal playback mode for simply displaying images. These modes will be discussed later. The owner-information display mode and classifying mode will also be described later, as mentioned above.

If an owner's-information receive mode is set, owner's data received by the communication unit 15 is input to the control circuit 10 via the communication control circuit 14. The owner's data is applied to and stored in the memory 13, as mentioned above.

If an image-file transmit mode is set, an image file that has been recorded on the memory card 19 is read and applied to the communication unit 15 via the memory card interface 18, control circuit 10 and communication control circuit 14. The image file is transmitted by the communication unit 15.

If an image-file receive mode is set, an image file that has been transmitted from another digital still camera or the like is received by the communication unit 15. The image file received is applied to the control circuit 10 via the communication control circuit 14. The image file received contains the above-mentioned photographer/transferor history table. Further, update processing is executed. In update processing, owner's data is read from the memory 13 and data indicating the owner of the digital still camera represented by the owner's data is added on as transferor data to the photographer/transferor history table. The image file in which the updated photographer/transferor history table has been recorded in the header recording area thereof is recorded on the memory card 19.

Figure 4:
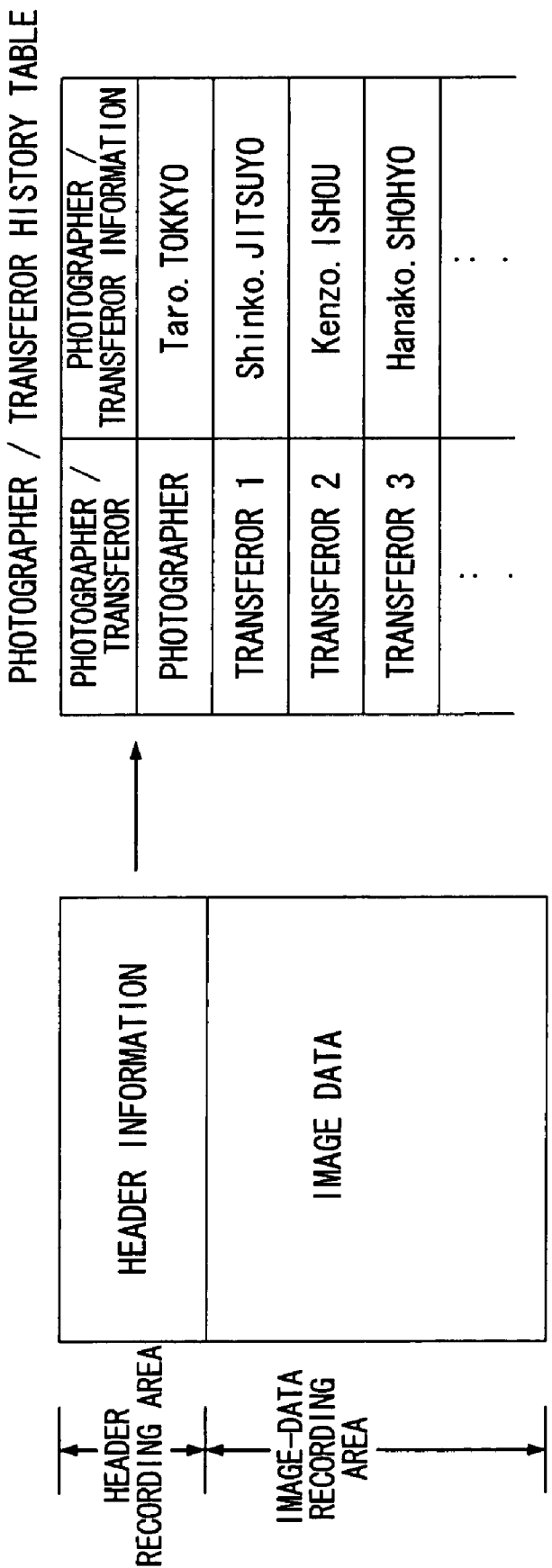
FIG. 4 illustrates an example of the file structure of an image file.

FIG. 4 illustrates the file structure (data structure) of an image file.

The image file includes a header recording area and an image-data recording area.

Image data is recorded in the image-data recording area.

The header recording area contains the photographer/transferor history table, as mentioned above, in addition to data for managing the image file. In the case of a digital still camera in which an image file has already been recorded, as in a case where data (e.g., Taro TOKKYO), which is indicative of the photographer of a subject image represented by image data that has been recorded in the image-data recording area, and the image file have been transmitted from another digital still camera, the photographer/transferor history table will contain the data indicating the name of the owner (who is a transferor of the image file) of the digital still camera that received the photographer data and image file, as mentioned above. Further, the photographer/transferor history table also contains thumbnail images (not shown) of the photographer and transferors.

Figure 5:
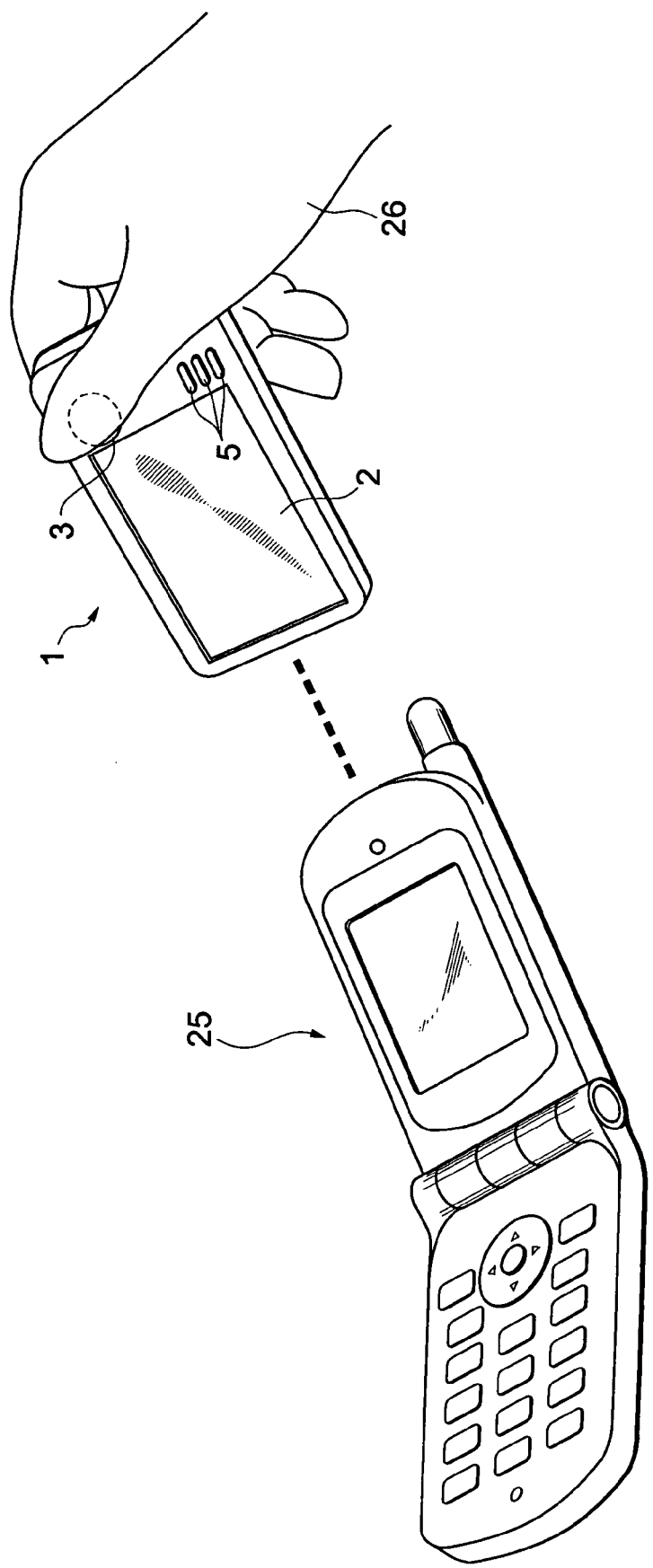
FIG. 5 illustrates the manner in which owner's data is being recorded.

FIG. 5 illustrates the manner in which owner's data is being recorded in the digital still camera 1.

As mentioned above, the digital still camera 1 is provided with the communication unit 15 whereby it is possible to communicate with a mobile telephone 25. Owner's data has been stored in the mobile telephone 25. The stored owner's data is transmitted to the digital still camera 1. By setting the digital still camera 1 to the receive mode, the owner's data that is transmitted from the mobile telephone 25 is received and, as described above, the owner's data is stored in the memory of the digital still camera 1.

It may of course be so arranged that the digital still camera itself is provided with an input unit and owner's data is allowed to be input from the input unit.

Figure 6:
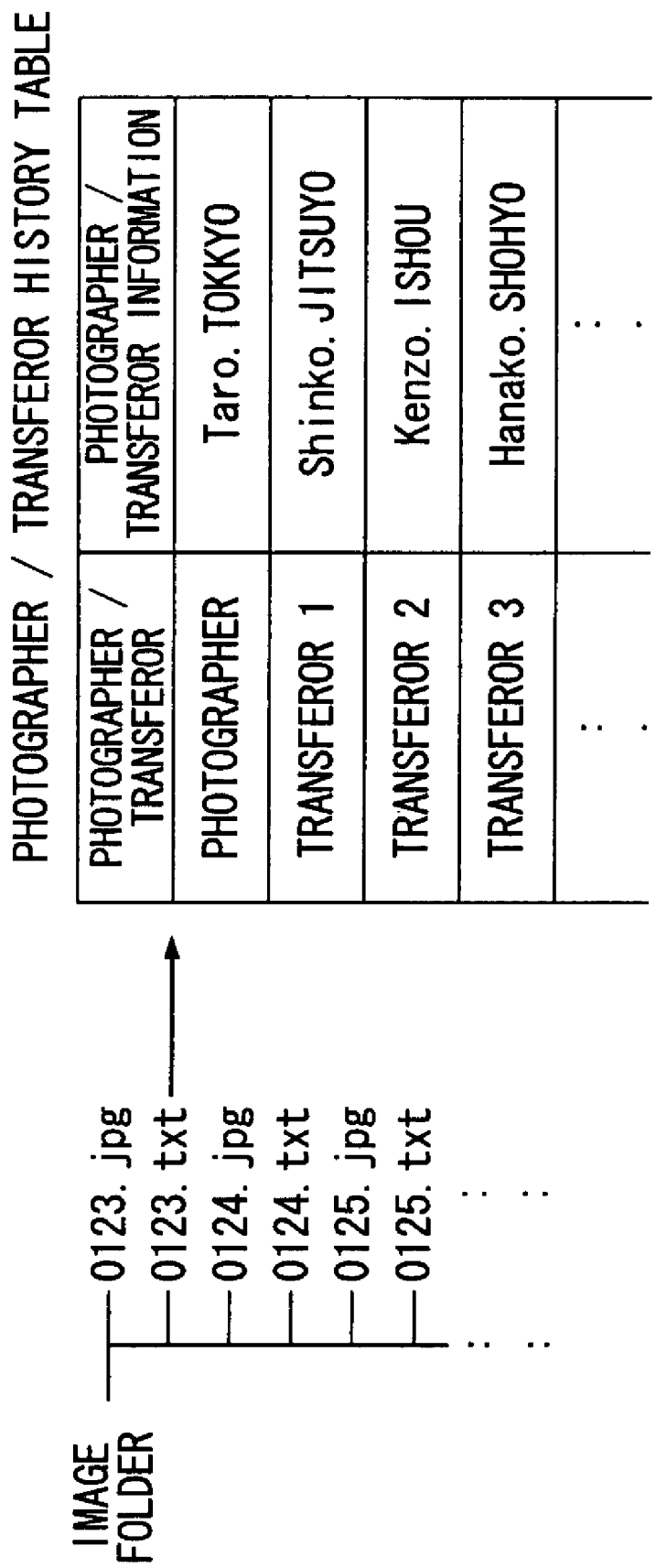
FIG. 6 illustrates the directory structure of a memory card.

FIG. 6 illustrates an example of the directory structure of a memory card.

An image folder is generated. The image folder contains image files having jpg as the extension and text files having txt as the extension. In a text file corresponding to an image file, a file name identical with the name of the image file is stipulated as the name of the text file. A photographer/transferor history table containing the photographer and transferors, etc., of the image represented by the image file has been recorded in the text file corresponding to the image file.

The photographer/transferor history table, rather than recording it in the header recording area of the image file as described above, can also be recorded in a text file that is different from the image file (there is no limitation upon the text file and the extension also may be any extension).

Figure 7:
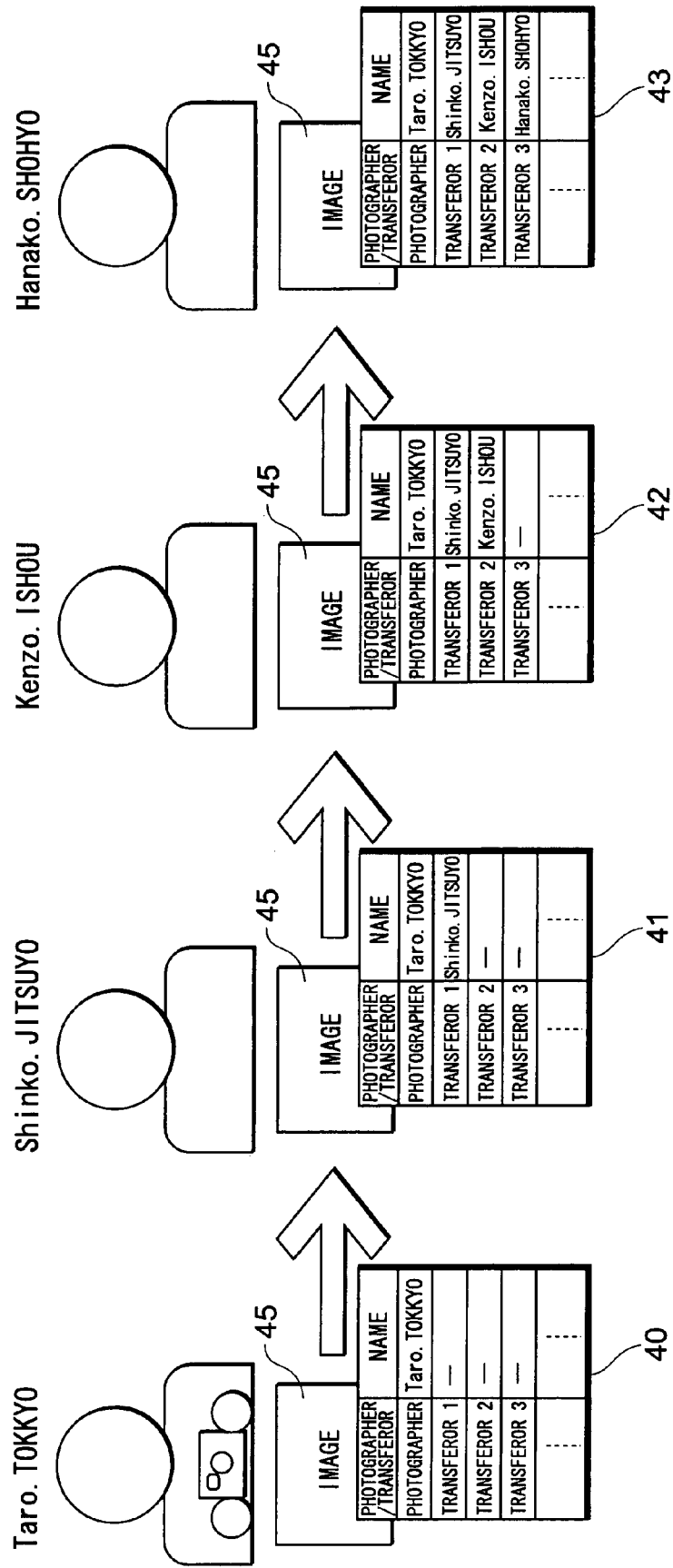
FIG. 7 illustrates the manner in which an image file is transferred.

FIG. 7 illustrates the manner in which an image file is transferred.

Assume that a subject has been imaged by "Taro Tokkyo" results in the generation of an image file 45 representing the image of the subject. When this done, owner's data is read from the digital still camera and a photographer/transferor history table 40 in which "Taro Tokkyo" has been written as the photographer is generated. The photographer/transferor history table 40 generated is recorded in the header recording area of the image file. It goes without saying that it will suffice if the photographer/transferor history table 40 can be transferred together with the image file, and the photographer/transferor history table 40 need not necessarily be recorded in the header recording area.

If the image file 45 is transferred to the digital still camera of "Shinko Jitsuyo", the owner's data is read from this digital still camera and is written to the photographer/transferor history table 40. A photographer/transferor history table 41 is obtained by such updating. Similarly, if the image file 45 is transferred to "Kenzo Isyou" and to "Hanako Shohyo" in succession, then photographer/transferor history tables 42 and 43 in which "Kenzo Isyou" and "Hanako Shohyo" have been written as transferors are obtained.

Thus, photographer/transferor history tables are generated and the photographer and transferors of an image file can be determined from the photographer/transferor history tables. It goes without saying that even though an image file is transferred, the image file remains in the digital still camera that was the source of the transfer so long as the image file is not erased. Accordingly, by referring to a photographer/transferor history table, it is possible to check the photographer of an image represented by an image file as well as transferors of this image file. Furthermore, in a case where there are a number of image files and photographer/transferor history tables corresponding to these image files, image files can be classified on a per-photographer or per-transferor basis.

Figure 8:
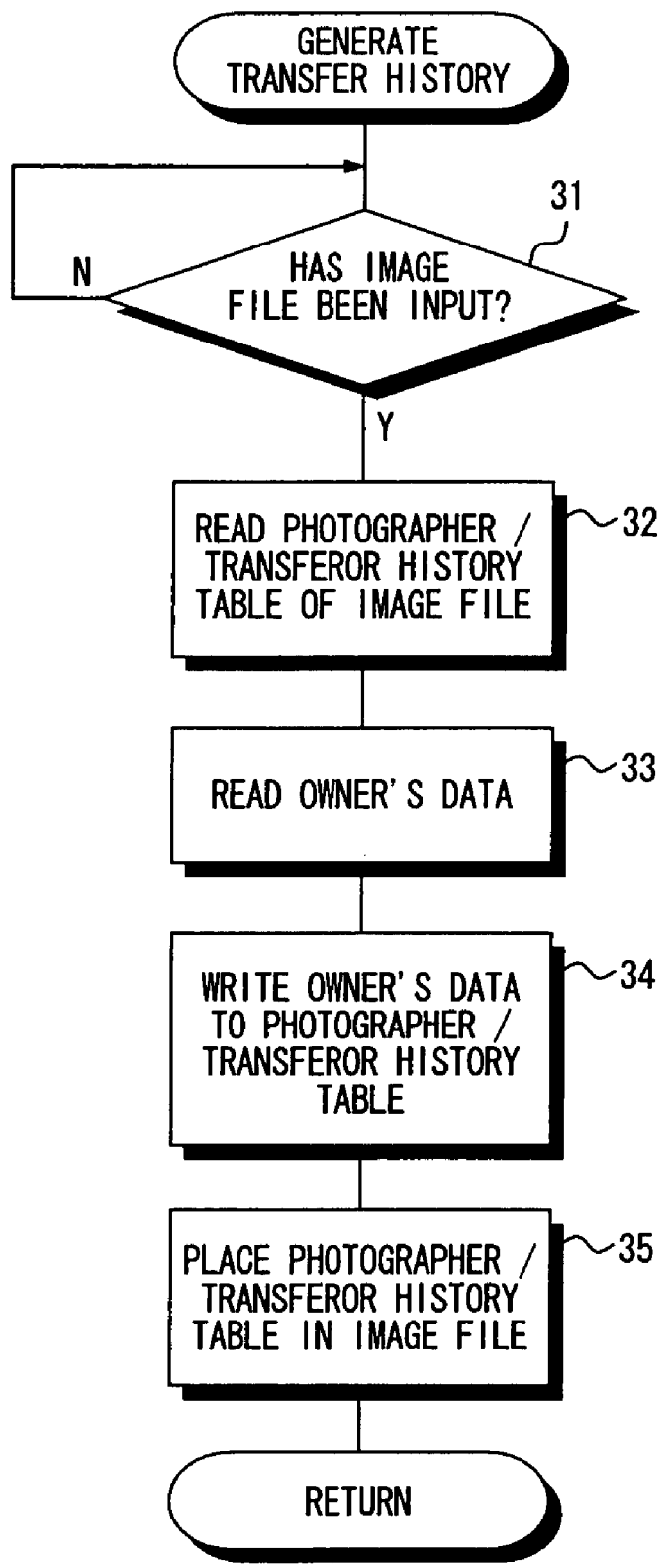
FIG. 8 is a flowchart illustrating processing for generating a transfer history.

FIG. 8 is a flowchart illustrating processing for generating a transfer history.

If an image file is input to the digital still camera ("YES" at step 31), then the photographer/transferor history table for this image file is read (step 32). Next, owner's data indicative of the digital still camera to which the image file has been input is read (step 33). The owner of the camera represented by the read owner's data is written to the photographer/transferor history table as a new transferor (step 34). The photographer/transferor history table thus updated is planted in the image file (step 35).

Figure 9:
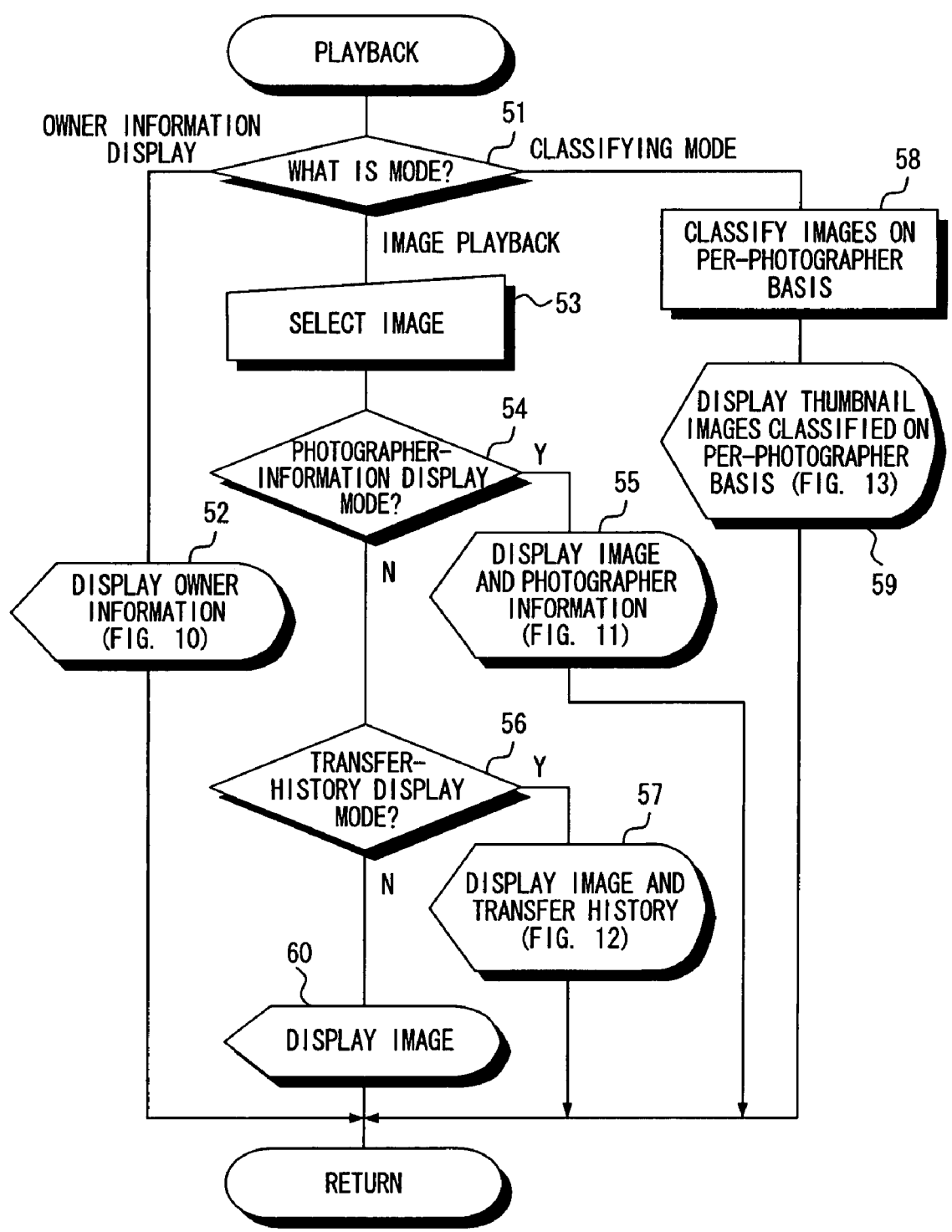
FIG. 9 is a flowchart illustrating reproduction processing.

FIG. 9 is a flowchart illustrating reproduction processing executed by the digital still camera. FIGS. 10 to 13 illustrate examples of images displayed on the display screen of the digital still camera.

A mentioned above, the playback mode includes an owner-information display mode, an image playback mode and a classifying mode. Which mode has been selected is checked (step 51).

If the owner-information display mode has been selected (step 51), then the owner's data that has been stored in the digital still camera is read. Owner information represented by the owner's data is displayed on the display screen (step 52).

Figure 10:
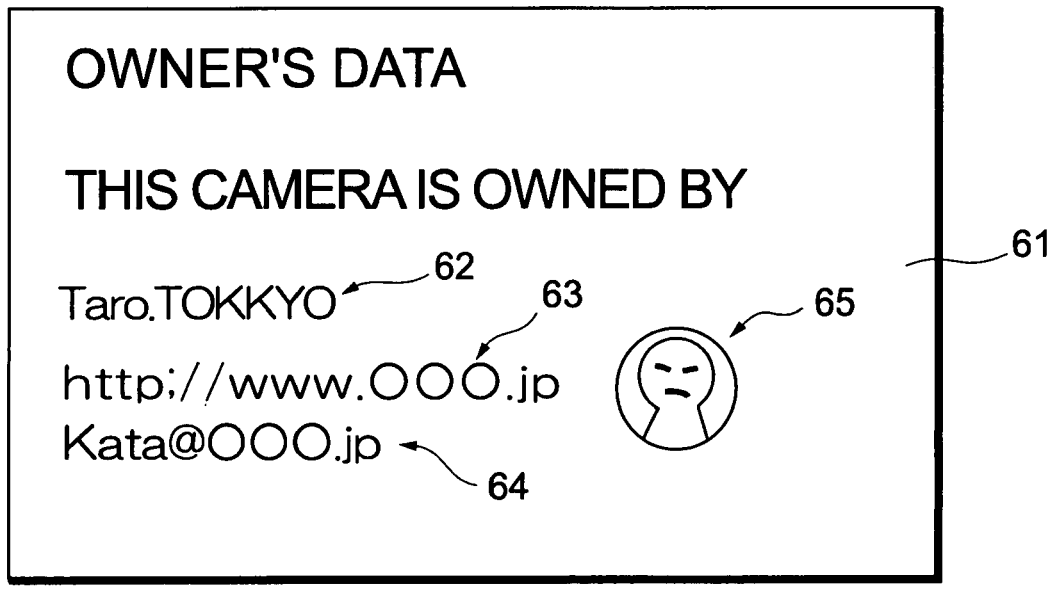
FIGS. 10 to 13 illustrate examples of images displayed on a display screen.

FIG. 10 illustrates an example of the owner's-information image displayed on the display screen.

An owner's-information image 61 include the name 62 of the owner of the digital still camera, the URL (Uniform Resource Locator) 63 of a website possessed by the owner of the digital still camera, the e-mail address 64 of the owner of the digital still camera, and an image 65 of the owner of the digital still camera. It goes without saying that not all of these items of information need be included in the owner's data. The information that can be represented by the owner's data is displayed in the owner's-information image 61.

With reference again to FIG. 9, if the image playback mode is selected (step 51), then the image that is to be displayed is selected by the user (step 53). The image playback mode further includes a photographer-information display mode, a transfer-history display mode and a normal image display mode, etc.

If the photographer-information display mode is set ("YES" at step 54), then the photographer/transferor history table corresponding to the selected image is read and the photographer information contained in the read table and the selected image are displayed on the display screen (step 55).

Figure 11:
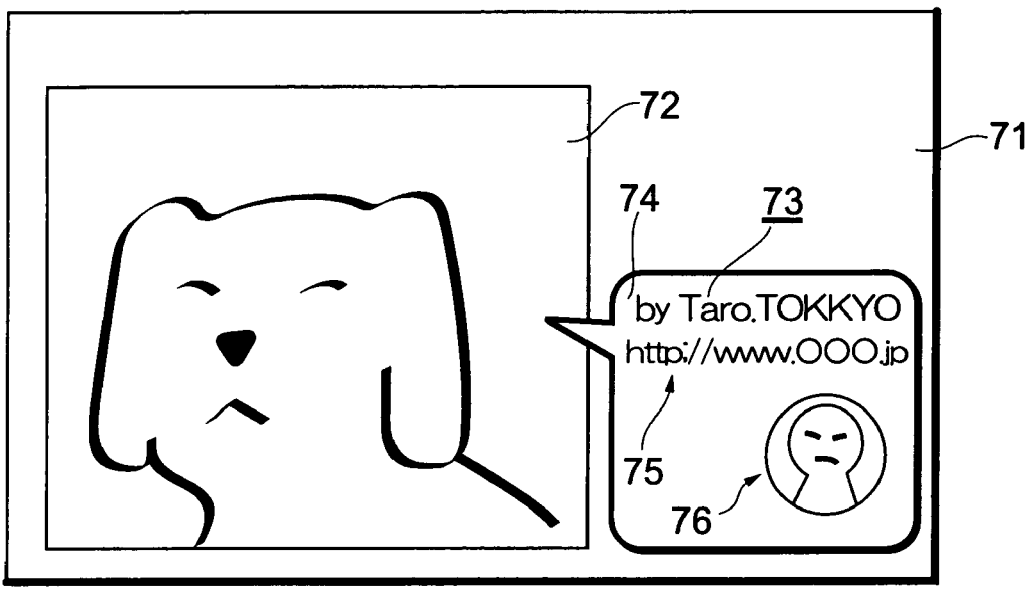

FIG. 11 illustrates an example of an image for display, the image including the selected image and the photographer information.

An image 71 for display includes an area 72 that displays the selected image and a photographer-information display area 73. The image display area 72 is formed over substantially the entirety of the display image 71, and the selected image is being displayed in the image display area 72. The photographer information corresponding to the selected image is being displayed in the photographer-information display area 73. The photographer-information display area 73 includes the name 74 of the photographer, the URL 75 of the photographer and an image 76 of the photographer.

With reference again to FIG. 9, if the transfer-history display mode is selected ("NO" at step 54, "YES" at step 56), then the selected image and the transfer history of the selected image are displayed on the display screen (step 57).

Figure 12:
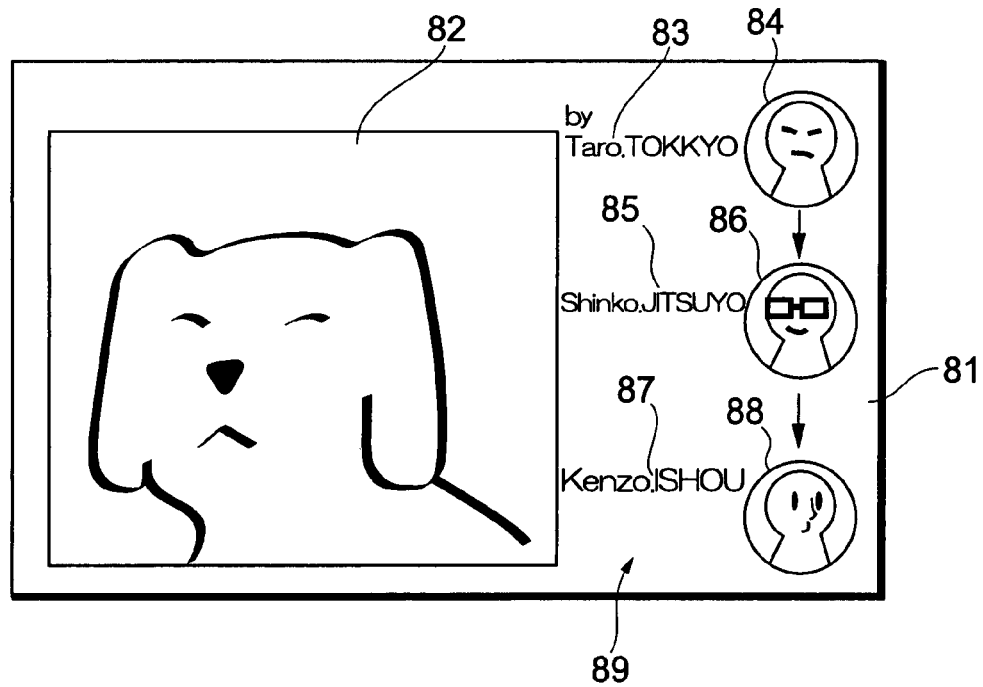

FIG. 12 illustrates an example of an image for display, the image including the selected image and the transferor history.

An image 81 for display includes an area 82 that displays the selected image and an area 89 that displays the transferor history, etc.

The area 82 that displays the selected image is formed over substantially the entirety of the display image 81.

The area 89 that displays the transferor history, etc., is defined on the right side of the area 82 that displays the selected image. The name 83 of the photographer that shot the image being displayed in the area 82 and an image 84 of this photographer are being displayed in the area 89 that displays the transferor history. Also being displayed in the area 89 that displays the transferor history are transferor names 85, 87 and images 86, 88 of these transferors. By observing this transferor history, etc., the photographer of the image 82 and which users were involved in inputting the image 82 can be determined. Naturally, the information relating to the photographer need not necessarily be displayed in the area 89 that displays the transferor history, etc.

With reference again to FIG. 9, if neither the photographer-information display mode nor the transfer-history display mode is set ("NO" at steps 54 and 56), then the normal image display mode is set and the selected image is displayed on the display screen (step 60).

If the classifying mode is set (step 51), then a number of images files that have been stored in the digital still camera are classified according to every photographer determined from the photographer/transferor history tables corresponding to respective ones of the image files (step 58). When this is done, thumbnail images represented by thumbnail image data that has been stored in the headers of the image files are displayed upon being classified on a per-photographer basis (step 59).

Figure 13:
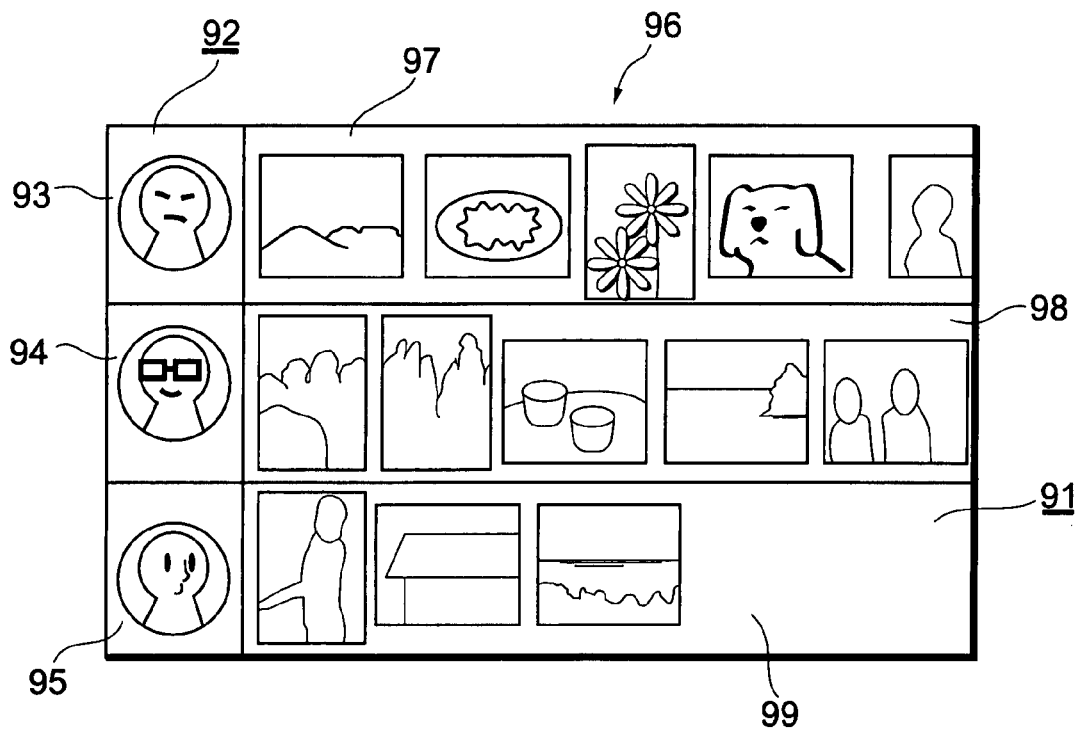

FIG. 13 illustrates an example of a display image in which thumbnail images are being displayed upon being classified on a per-photographer basis.

A display image 91 includes a photographer-image display area 92 and a thumbnail-image display area 96.

Images 93, 94, 95 of classified photographers are being displayed in the photographer-image display area 92. Image data representing the images of these photographers is contained in the photographer/transferor history tables described above. Display areas 97, 98, 99 corresponding to respective ones of the images 93, 94, 95 of the photographers have been defined in the thumbnail-image display area 96. Thumbnail images of the images shot by the photographers whose images are 93, 94, 95 are displayed in the areas 97, 98, 99, respectively. Thus, images can be classified and displayed on a per-photographer basis.

Although thumbnail images are displayed upon being classified on a per-photographer basis in the above-described embodiment, thumbnail images can also be displayed upon being classified on a per-transferor basis.

Figure 14:
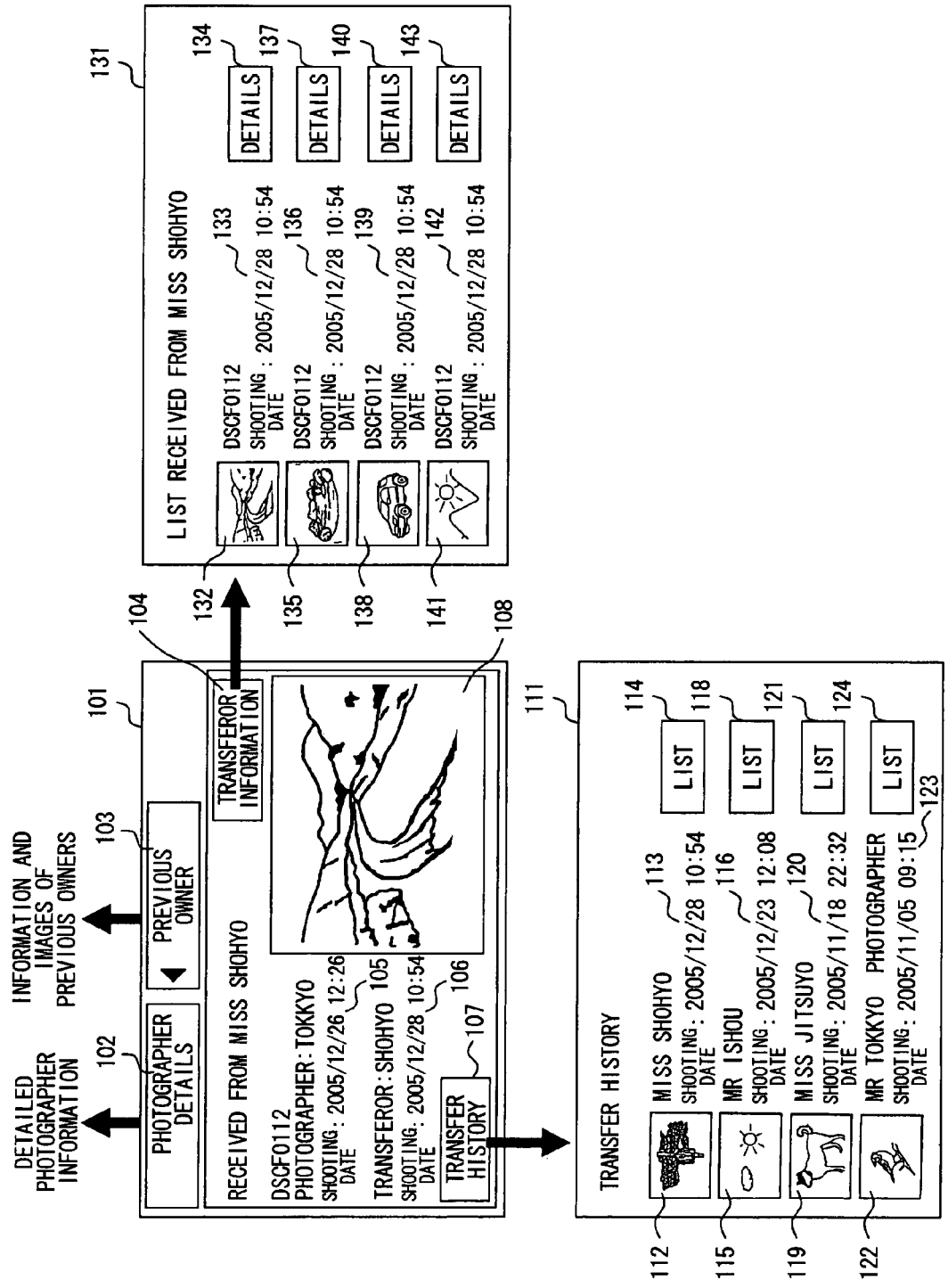
FIG. 14 illustrates a transition of images displayed on a display screen.

FIG. 14, which illustrates a modification, shows an example of a transition of display images displayed on a display screen.

Assume that a display image 101 at the upper left of FIG. 14 is displayed on the display screen by selecting an image displayed on the display screen.

The display image 101 includes a photographer detailed-information area 102, previous owner information 103, a transferor-information display area 104, a photographer-information display area 105, a transferor-information display area 106, a transfer history area 107 and a selected-image display area 108.

The photographer detailed-information area 102 is selected by the user when detailed information concerning the photographer of the image being displayed in the selected-image display area 108 is displayed. By selecting the photographer detailed-information area 102, thumbnail images of images shot by the photographer and shooting dates, etc., are displayed in the form of a list on the display screen.

The previous owner information area 103 is selected by the user in a case where the image file representing the image being displayed in the selected-image display area 108 has been input from another digital still camera (namely a case where the image file has been transferred). By selecting the area 103, thumbnail images of images represented by image data that was input from owners preceding the immediately preceding owner of the image being displayed in the area 108, as well as the acquisition dates (transfer dates or input dates thereof, are displayed in the form of a list on the display screen.

The transferor-information display area 104 is selected by the user in a case where information regarding the immediately preceding transferor of the image being displayed in the selected-image display area 108 is displayed. By selecting the area 104, thumbnail images of images that were transferred from the immediately preceding transferor and the acquisition dates (transfer dates or input dates) thereof are displayed in list form as in the manner of a display image 131 illustrated on the right side of FIG. 14.

Information such as the name of the photographer of the image being displayed in the selected-image display area 108 and the shooting date of the image is displayed in the photographer-information display area 105. Information such as the name of the immediately preceding transferor of the image being displayed in the selected-image display area 108 and the acquisition date thereof is displayed in the transferor-information display area 106.

The transfer history area 107 is selected by the user when the transfer history of the image being displayed in the selected-image display area 108 is displayed. By selecting the transfer history area 107, a transfer history image 111 is displayed on the display screen.

The transfer history of the image being displayed in the selected-image display area 108 is displayed in the transfer history image 111.

Images 112, 115, 119, 122 of transferors are being displayed in the transfer history image 111. Names of the transferors, acquisition dates 113, 116, 120, 123 and list areas 114, 118, 121, 124 are being displayed in association with the images 112, 115, 119, 122 of the transferors. If any one of the lists 114, 118, 121, 124 is selected, the image 131 of detailed information concerning the transferor corresponding to the selected list is displayed on the display screen.

The transferor details image 131 presents a display of thumbnail images 132, 135, 138, 141 of images that have been transferred from this transferor. Acquisition dates 133, 136, 139, 142 of the thumbnail images and details areas 134, 137, 138, 140 are being displayed in association with the thumbnail images 132, 135, 138, 141. If any one of the details areas 134, 137, 138, 140 is selected, detailed information regarding the corresponding image is displayed in the manner of the display image 101.

As many apparently widely different embodiments of the present invention can be made without departing from the spirit and scope thereof, it is to be understood that the invention is not limited to the specific embodiments thereof except as defined in the appended claims.

What is claimed is:

1. An image reproducing apparatus comprising:
 a data input device for inputting image data, photographer data representing a photographer who has shot the image of a subject represented by the image data, and transfer history data representing a history of transferors indicative of owners of image reproducing apparatuses to which the image data has already been input;
 a display device for displaying on a display screen the image of the subject represented by the image data that has been input from said data input device;
 an owner's-data storage device for storing owner's data;
 a transfer history data updating device for executing update processing whereby owner's data that has been stored in said owner's-data storage device is added to the transfer history data; and
 an output device for outputting the image data and photographer data that has been input from said data input device and transferor history data that has been subjected to update processing by said transfer history data updating device.

2. The apparatus according to claim 1, further comprising:
 a classifying device for classifying, by the photographer or by the transferor, the image data that has been input from said data input device; and
 a display control device for controlling said display device in such a manner that the image of a subject represented by image data that has been classified by said classifying device is displayed on the display screen.

3. The apparatus according to claim 1, further comprising a display control device for controlling said display device in such a manner that the transferor history represented by the transfer history data that has been input from said data input device is displayed on the display screen.

4. The apparatus according to claim 1, further comprising an owner's-data input device for inputting owner's data;
wherein said owner's-data storage device stores owner's data that has been input from said owner's-data input device.

5. The apparatus according to claim 1, further comprising a display control device for controlling said display device in such a manner that owner information represented by owner's data that has been stored in said owner's-data storage device is displayed on the display screen.

6. A method of controlling an image reproducing apparatus, comprising:
inputting image data, photographer data representing a photographer who has shot the image of a subject represented by the image data, and transfer history data representing a history of transferors indicative of owners of image reproducing apparatuses to which the image data has already been input;
displaying on a display screen the image of the subject represented by the image data that has been input;
storing owner's data in advance;
executing update processing whereby owner's data that has been stored is added to the transfer history data; and
outputting the image data and photographer data that has been input and transferor history data that has been subjected to update processing.

7. A computer readable medium having encoded thereon a computer image reproducing program comprising a set of instructions when executed by a computer to implement a method for controlling an image reproducing apparatus, the method comprising:
inputting image data, photographer data representing a photographer who has shot the image of a subject represented by the image data, and transfer history data representing a history of transferors indicative of owners of image reproducing apparatuses to which the image data has already been input;
displaying on a display screen the image of the subject represented by the image data that has been input;
storing owner's data in advance;
executing update processing whereby owner's data that has been stored is added to the transfer history data; and
outputting the image data and photographer data that has been input and transferor history data that has been subjected to update processing.

* * * * *